(12) United States Patent
Lecours et al.

(10) Patent No.: US 9,308,645 B2
(45) Date of Patent: Apr. 12, 2016

(54) METHOD OF INFERRING INTENTIONS OF AN OPERATOR TO MOVE A ROBOTIC SYSTEM

(71) Applicants: GM GLOBAL TECHNOLOGY OPERATIONS LLC, Detroit, MI (US); Universite Laval, Quebec (CA)

(72) Inventors: Alexandre Lecours, Quebec (CA); Boris Mayer-St-Onge, Quebec (CA); Clement Gosselin, Quebec (CA); Dalong Gao, Rochester, MI (US)

(73) Assignees: GM Global Technology Operations LLC, Detroit, MI (US); Universite Laval, Quebec (CA)

(*) Notice: Subject to any disclaimer, the term of this patent is extended or adjusted under 35 U.S.C. 154(b) by 265 days.

(21) Appl. No.: 13/788,575

(22) Filed: Mar. 7, 2013

(65) Prior Publication Data
US 2013/0253702 A1 Sep. 26, 2013

Related U.S. Application Data

(60) Provisional application No. 61/613,627, filed on Mar. 21, 2012.

(51) Int. Cl.
*B25J 9/16* (2006.01)
*B25J 5/04* (2006.01)
*B25J 9/00* (2006.01)

(52) U.S. Cl.
CPC ... *B25J 9/163* (2013.01); *B25J 5/04* (2013.01); *B25J 9/0018* (2013.01); *G05B 2219/37388* (2013.01); *G05B 2219/37437* (2013.01);

(Continued)

(58) Field of Classification Search
CPC ............ B25J 5/04; B25J 9/0018; B25J 9/046; B25J 9/163; G05B 2219/36429; G05B 2219/37388; G05B 2219/37437; G05B 2219/40408; G05B 2219/39342; G05B 2219/39343; G05B 2219/39339; G05B 2219/40119
USPC ................. 700/245, 250, 254, 257, 258, 260; 901/3, 46, 32–34, 45
See application file for complete search history.

(56) References Cited

U.S. PATENT DOCUMENTS 6,204,620 B1 * 3/2001 McGee et al. ........... 318/568.11
6,394,731 B1 5/2002 Konosu et al.

(Continued)

FOREIGN PATENT DOCUMENTS

WO 0132547 A1 5/2001

OTHER PUBLICATIONS

Naoyuki Takesue et al, Kinesthetic Assistance for Improving Task Performance—The Case of Window Installation Assist, Int. J. of Automation Technology vol. 3. No. 6 2009, pp. 663-670.*

(Continued)

*Primary Examiner* — Khoi Tran
*Assistant Examiner* — Abby Lin
(74) *Attorney, Agent, or Firm* — Quinn Law Group, PLLC

(57) ABSTRACT

A method of inferring intentions of an operator to move a robotic system includes monitoring the intention of the operator, with a controller. The intention of the operator is inferred to be one of a desired acceleration and a desired deceleration. The intention of the operator is also as a desired velocity. Admittance parameters are modified as a function of at least one of the inferred acceleration, deceleration, and velocity.

19 Claims, 5 Drawing Sheets

(52) U.S. Cl.
CPC ............... *G05B2219/39339* (2013.01); *G05B 2219/39342* (2013.01); *G05B 2219/39343* (2013.01); *G05B 2219/39439* (2013.01); *G05B 2219/40408* (2013.01)

(56) References Cited

U.S. PATENT DOCUMENTS

| | | | | |
|---|---|---|---|---|
| 6,522,952 | B1* | 2/2003 | Arai | B25J 9/1612 414/591 |
| 7,185,774 | B2* | 3/2007 | Colgate et al. | 212/331 |
| 2004/0026349 | A1* | 2/2004 | Colgate et al. | 212/284 |
| 2005/0075739 | A1 | 4/2005 | Nishizawa | |
| 2011/0276058 | A1 | 11/2011 | Choi et al. | |
| 2012/0020038 | A1 | 1/2012 | Nishiyama | |

OTHER PUBLICATIONS

Full Version of Takesue et al, Kinesthetic Assistance for Improving Task Performance: The Case of Window INstallation Assist, International Journal of AUtomation Technology, 2009-2011 (for some reason, some pages were missing before).*

* cited by examiner

METHOD OF INFERRING INTENTIONS OF AN OPERATOR TO MOVE A ROBOTIC SYSTEM

CROSS-REFERENCE TO RELATED APPLICATIONS

This application claims priority to U.S. Provisional Patent Application No. 61/613,627, filed on Mar. 21, 2012, which is hereby incorporated by reference in its entirety.

TECHNICAL FIELD

The present disclosure relates to a method of inferring intentions of an operator to move a robotic system.

BACKGROUND

Overhead bridge cranes are widely used to lift and relocate large payloads. Generally, the displacement in a pick and place operation involves three translational degrees of freedom and a rotational degree of freedom along a vertical axis. This set of motions, referred to as a Selective Compliance Assembly Robot Arm ("SCARA") motions or "Schönflies" motions, is widely used in industry. A bridge crane allows motions along two horizontal axes. With appropriate joints, it is possible to add a vertical axis of translation and a vertical axis of rotation. A first motion along a horizontal axis is obtained by moving a bridge on fixed rails while the motion along the second horizontal axis is obtained by moving a trolley along the bridge, perpendicularly to the direction of the fixed rails. The translation along the vertical axis is obtained using a vertical sliding joint or by the use of a belt. The rotation along the vertical axis is obtained using a rotational pivot with a vertical axis.

There are partially motorized versions of overhead bridge cranes that are displaced manually along horizontal axes and rotated manually along the vertical axis by a human operator, but that include a motorized hoist in order to cope with gravity along the vertical direction. Also, some bridge cranes are displaced manually along all of the axes, but the weight of the payload is compensated for by a balancing device in order to ease the task of the operator. Such bridge cranes are sometimes referred to as assist devices. Balancing is often achieved by pressurized air systems. These systems need compressed air in order to maintain pressure or vacuum—depending on the principle used—which requires significant power. Also, because of the friction in the compressed air cylinders, the displacement is not very smooth and can even be bouncy. Balancing can be achieved using counterweights, which add significant inertia to the system. Although helpful and even necessary for the vertical motion, such systems attached to the trolley of a bridge crane add significant inertia regarding horizontal motion due to moving the mass of these systems. In the case of balancing systems based on counterweights, the mass added can be very large, even larger than the payload itself. If the horizontal traveling speed is significant, the inertia added to the system becomes a major drawback.

There are also fully motorized versions of such bridge cranes that require powerful actuators, especially for the vertical axis of motion which has to support the weight of the payload. These actuators are generally attached to the trolley or bridge and are then in motion. The vertical translation actuator is sometimes attached to the bridge and linked to the trolley by a system similar to what is used in tower cranes.

SUMMARY

A method of inferring intentions of an operator to move a robotic system includes monitoring the intention of the operator, with a controller. The intention of the operator is inferred to be one of a desired acceleration and a desired deceleration. The intention of the operator is also as a desired velocity. Admittance parameters are modified as a function of at least one of the inferred acceleration, deceleration, and velocity.

A robotic system includes a trolley, a sensing handle, and a controller. The trolley is configured for movement along a first axis. The sensing handle is operatively connected to the trolley and is configured to be grasped by an operator such that the sensing handle measures a force between the operator and the robotic system. The controller is operatively connected to the sensing handle. The controller is configured to determine a motion of the trolley desired by the operator such that one of a desired acceleration and a desired deceleration are deduced as a function of the measured force to move the trolley along the first axis.

A method of moving a robotic system along the first axis includes monitoring the intention of the operator, with a controller. The intention of the operator is deduced to be one of a desired acceleration and a desired deceleration. The admittance parameters are adjusted as a function of one of a magnitude of the desired acceleration and the desired deceleration. The admittance parameters are decreased when the intention of acceleration is deduced. The admittance parameters are increased when the intention of deceleration is deduced. Power is transmitted to a motor to move a trolley along a firstaxis as a function of the desired intention of the operator.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

Referring now to the figures, which are exemplary embodiments and wherein like elements are numbered alike.

DESCRIPTION OF THE PREFERRED EMBODIMENTS

Figure 1:
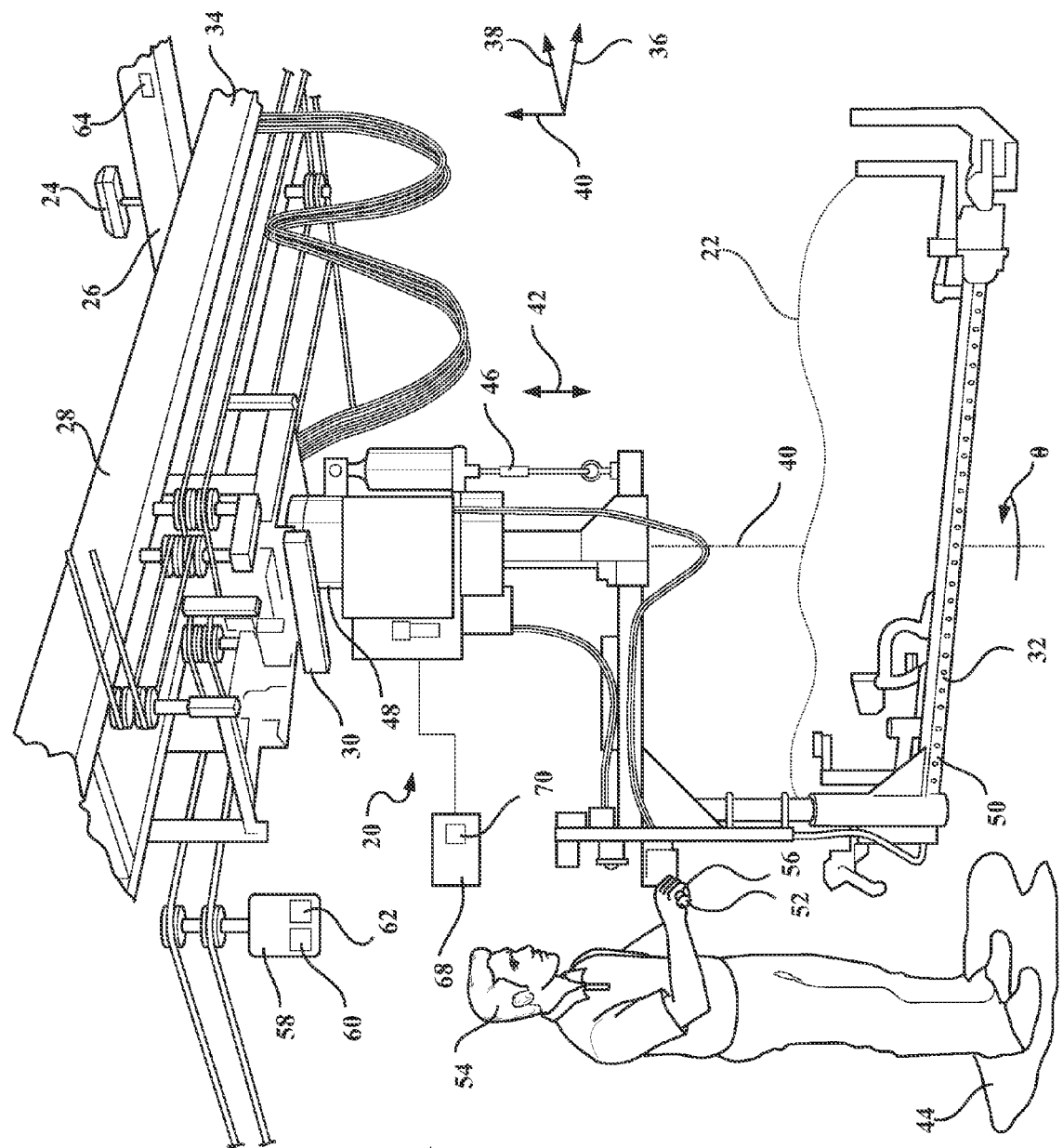
FIG. 1 is a schematic perspective view of robotic system mounted to a support structure.

Referring to the drawings, wherein like reference numbers refer to like components, an assistive device or robotic system 20, configured for moving a payload 22 in a plurality of directions, is shown in FIG. 1. The robotic system 20 is mounted to a stationary support structure 24 that is configured to support the robotic system 20 and the payload 22. The support structure 24 includes, but is not limited to a pair of parallel rails 26 or runway tracks.

With continued reference to FIG. 1, the robotic system 20 may include a bridge crane 28, a trolley 30, and an end effector 32. The bridge crane 28 is a structure that includes at least one girder 34 that spans the pair of parallel rails 26. The bridge crane 28 is adapted to carry the payload 22 along an X axis 36. The trolley 30 is movably attached to girders 34 of the bridge crane 28 such that the trolley 30 is adapted to carry the payload 22 along a Y axis 38, in generally perpendicular relationship to the X axis 36. A Z axis 40 extends in a vertical direction 42, with respect to the ground 44. The Z axis 40 is defined between the intersection of the X axis 36 and the Y axis 38. The end effector 32 operatively extends from the trolley 30, along the Z axis 40. A vertical slide 46 is operatively disposed between the end effector 32 and the trolley 30 such that the end effector 32 is movable in the vertical direction 42. The vertical movement of the vertical slide 46 may be achieved with a pneumatic cylinder, an electrical cylinder, and the like. Additionally, a rotational joint 48 may be disposed between the end effector 32 and the trolley 30 such that the end effector 32 may rotate about the Z axis 40. It should be appreciated, however, that the assistive or robotic system 20 is not limited to overhead bridge cranes 28.

The end effector 32 includes a support portion 50 and a sensing handle 52. The support portion 50 is configured to support the payload 22. The sensing handle 52 may be operatively attached to the support portion 50 and configured to be grasped by the operator 54. The operator 54 grasps the sensing handle 52 and directs the robotic system 20 along or about the intended X, Y, and/or Z axis 36, 38, 40. The sensing handle 52 includes force sensors 56 which are configured to measure a force $f_H$ between the operator 54 and the robotic system 20.

The robotic system 20 is propelled by motors 58. More specifically, the robotic system 20 includes at least one motor 58 which is configured to drive, or otherwise propel the robotic system 20 along and/or about the intended X, Y, and/or Z axis 36, 38, 40. Each motor 58 includes an encoder 62 and a motor drive 60. The rails 26 include hall-effect sensors 64. The encoders 62 and the hall-effect sensors 64 are configured to measure and calibrate the position of the robotic system 20 along the X, Y, and/or Z axis 36, 38, 40.

Figure 3:
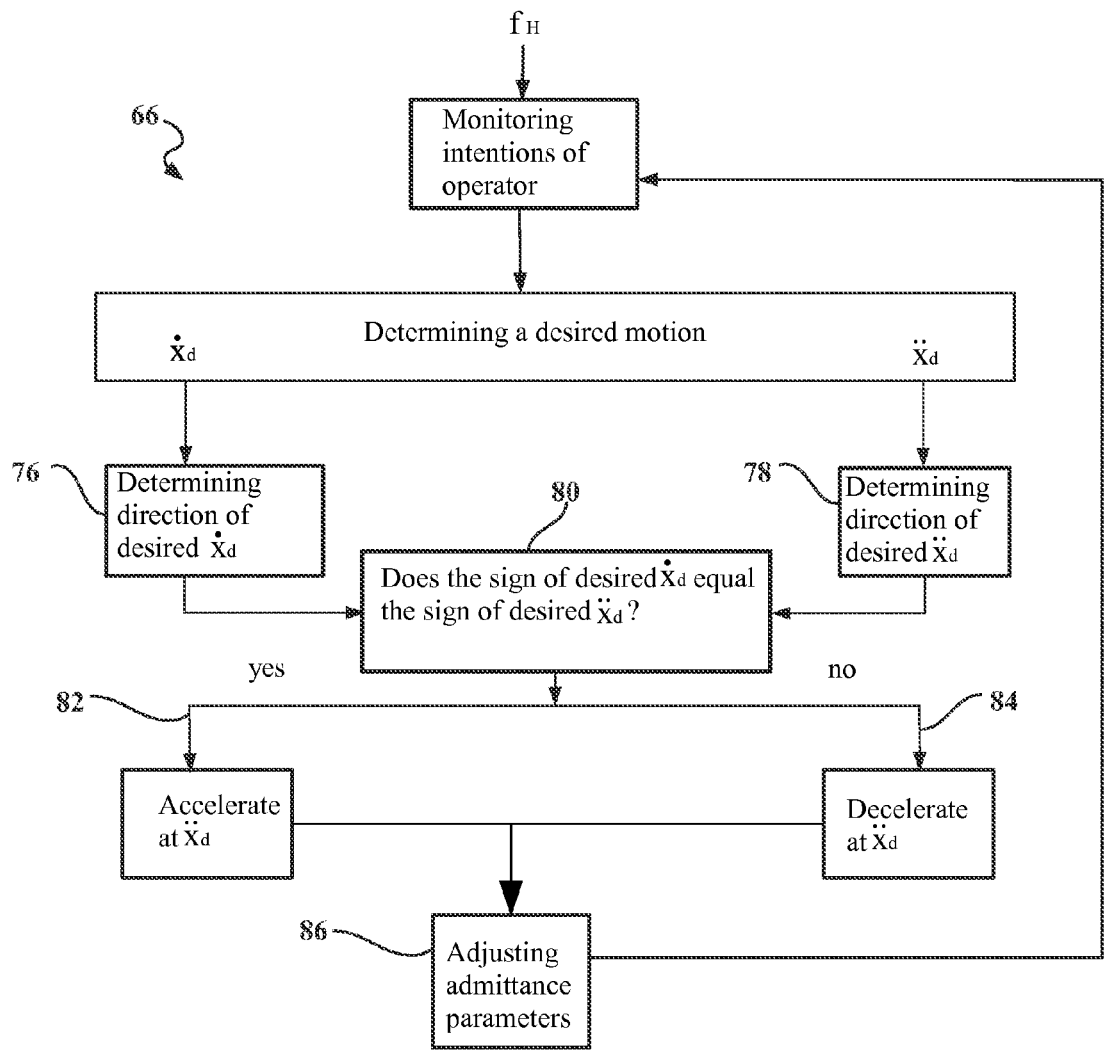
FIG. 3 is a schematic diagrammatic view of a variable admittance control scheme for inferring operator intentions to move the robotic system.

The robotic system 20 provides physical Human-Robot Interactions (pHRI). The pHRI exploits the force capabilities of robots by directly combining the strength of robots with the skills of a human being, i.e., "human augmentation". A variable admittance control scheme, shown generally at 66 in FIG. 3, is provided for pHRI such that the robotic system 20 is operated by a human operator 54 and the robotic system 20, in turn, infers the operator's 54 intentions as a desired acceleration and/or desired velocity. The way to infer the operator's 54 intentions may depend on the desired acceleration $\ddot{x}_0$, which is intuitive to the operator 54. Additionally, the desired velocity $\dot{x}_0$, may also be taken into account. Both a virtual damping c and a virtual mass m of the robotic system 20 are varied, as a function of the inferred intentions of the operator 54. The virtual mass is a simulation of the mass being moved by the operator 54, as opposed to the actual mass the operator 54 would experience. Therefore, since the mass the operator 54 actually experiences is significantly reduced to the virtual mass, the operator 54 will not have to experience the effectively large mass they would ordinarily encounter if the actual mass had to be moved instead of the virtual mass. This provides improved ergonomics to the operator 54. Additionally, stability limits of the robotic system 20 are taken into account, while varying the parameters of the virtual damping and the virtual mass.

Referring to FIG. 1, the robotic system 20 may include a 4-degrees-of-freedom (4-dof) Intelligent Assist Device (IAD), which allows translations in all directions, i.e., along the X, Y, Z axes 36, 38, 40 and/or a rotation θ about the Z axis 40. By way of a non-limiting example, the total moving mass is approximately 500 kg in the direction of the X axis 36 and approximately 325 kg along the Y axis 38. Additionally, the payload 22 may vary between 0 and 113 kg. The horizontal workspace was 3.3 m×2.15 m while the vertical range of motion along the Z axis was 0.52 m. The range of rotation about the Z axis (vertical axis) was 120°. Three different control modes may be possible: autonomous motion, unpowered manual motion, and interactive motion (i.e., cooperation). It should be appreciated, however, that robotic systems 20 having more or less degrees-of-freedom may also be used.

Figure 2:
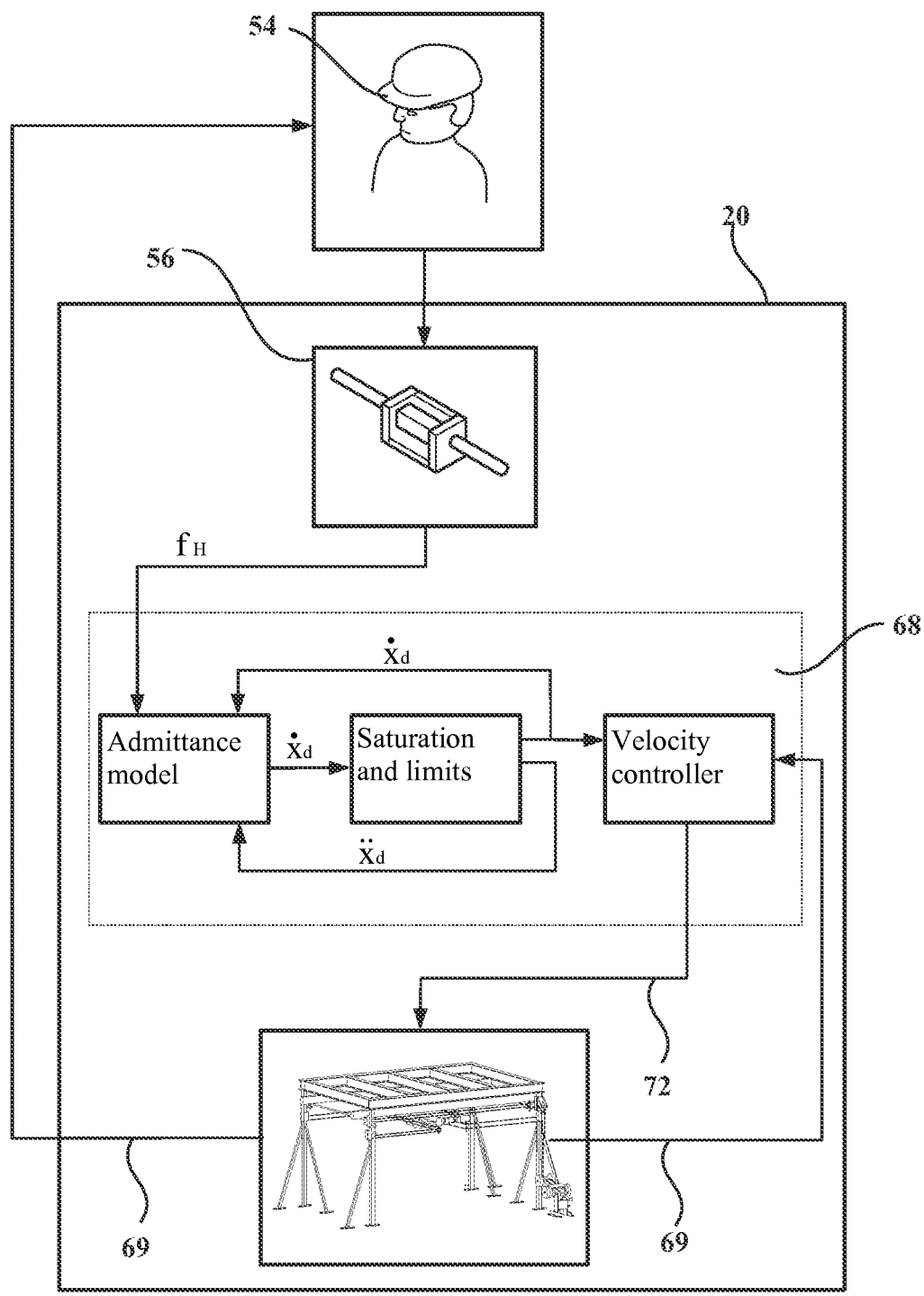
FIG. 2 is a schematic diagrammatic view of a control scheme for operating the robotic system.

A controller 68 is operatively connected to the robotic system 20, as shown in FIGS. 1 and 2. The controller 68 may include one or more integrated circuits, which may be augmented by various electronic devices such as voltage regulators, capacitors, drivers, timing crystals, communication ports, etc. The controller 68 may be a microcontroller using limited power and limited read only memory (ROM), random access memory (RAM), and/or electrically-programmable read only memory (EPROM), and any required input/output (I/O) circuit devices, as well as signal conditioning and buffer electronics. A processor 70 is used to provide the required processing power. Individual control algorithms resident in the controller 68 or readily accessible thereby, including any algorithm(s) or code required for inferring the operator's 54 intentions may be stored in memory, e.g., ROM, and automatically executed to provide the requested control functionality. The controller 68 also takes input from the sensors 56, 64, as noted above, via the sensing handle 52, the encoders 62, and the hall-effect sensors 64 to receive the force, position, velocity, and the like. The controller 68 processes this data and computes a desired output 72. The desired output 72 is transmitted to the motor drives 60, which, in turn, send power to the motors 58 to drive the corresponding motor 58 at a desired speed.

Referring to FIG. 2, the controller 68 is an admittance controller 68 which is configured to accept the force $f_H$ measured by the force sensors 56 as an input by the operator 54 and, in turn, output a displacement 72 of the end effector 32. The one-dimensional admittance equation may be expressed mathematically as:

$$f_H = m(\ddot{x}-\ddot{x}_0) + c(\dot{x}-\dot{x}_0) + k(x-x_0)$$

where $f_H$ is the interaction force, i.e., the force applied by the operation, m is the virtual mass, c is the virtual damping, k is the virtual stiffness, $x_0$ is the equilibrium point, x, $\dot{x}$, $\ddot{x}$ are respectively the position, velocity 69, and acceleration, and $x_0$, $\dot{x}_0$, $\ddot{x}_0$ are respectively the desired position, desired velocity, and desired acceleration. Since it is desired to simulate free motion, the stiffness k, as well as the desired position $x_0$, the desired velocity $\dot{x}_0$, the desired acceleration $\ddot{x}_0$ are set to zero. It should be appreciated that, while the one-dimensional admittance equation is shown and described, if x is a vector of (x, y, z, θ, etc.), this admittance equation may be multi-dimensional. The admittance equation may next be expressed mathematically as:

$$f_H = m\ddot{x} + c\dot{x}.$$

The trajectory to be followed by the robotic system 20 may be prescribed as a desired position or desired velocity. For velocity control, the desired velocity can be expressed mathematically as:

$$\dot{X}_d(s) = F_H(s)H(s)$$

where X(s) is the Laplace transform of x, $F_H(s)$ is the Laplace transform of $f_H$ and s is the Laplace variable. Velocity control is used.

A discretized desired velocity is obtained with a zero-order-hold, although a bilinear discretization may also be used. The discretized desired velocity may be mathematically represented as:

$$\dot{x}_d(k) = \frac{f_H(k) - c\dot{x}_d(k-1)}{m} T_s + \dot{x}_d(k-1)$$

where $f_H(k)$ is the interaction force at time step k, $\dot{x}_d(k)$ is the desired velocity, and $T_s$ is the sampling period. The desired acceleration at time step k, noted $\ddot{x}_d(k)$, may then be mathematically represented as:

$$\ddot{x}_d(k) = \frac{f_H(k) - c\dot{x}_d(k-1)}{m}.$$

A transfer function between the input force and the output velocity may be mathematically represented as:

$$H(s) = \frac{1/c}{\frac{m}{c}s + 1}$$

where m is the virtual mass and c is the virtual damping. Referring to H(s) transfer function, when the admittance parameters, i.e., virtual mass and virtual damping, are set to high values, a larger force is required by the operator 54 to move the robotic system 20 at a given velocity and/or given acceleration. However, these high values also mean that it is easier for the operator 54 to perform fine movements with the robotic system 20, since the robotic system 20 is less reactive. Conversely, when the admittance parameters are set to low values, it is easier to move the robotic system 20 at a high velocity and/or high acceleration, but is also more difficult to perform fine movements. The variable admittance control is configured to adjust the admittance parameters according to the operator's 54 inferred intentions. More specifically, high admittance parameters are desired when the operator 54 performs fine movements. The high admittance parameters provide stable and steady performance of the robotic system 20 when slower motion and position accuracy are desired. Likewise, lower admittance parameters are desired when movements involving large accelerations are performed and less precision is required. The lower admittance parameters provide fast responses by the robotic system 20 when a higher velocity is desired.

Figure 4A:
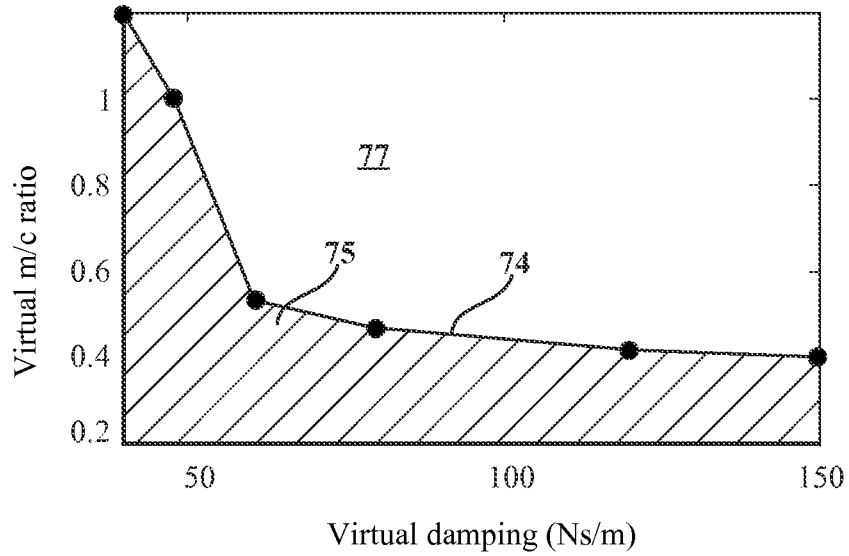
FIG. 4A is a schematic graphical representation of stability limits for motion of the robotic system along an X axis.
Figure 4B:
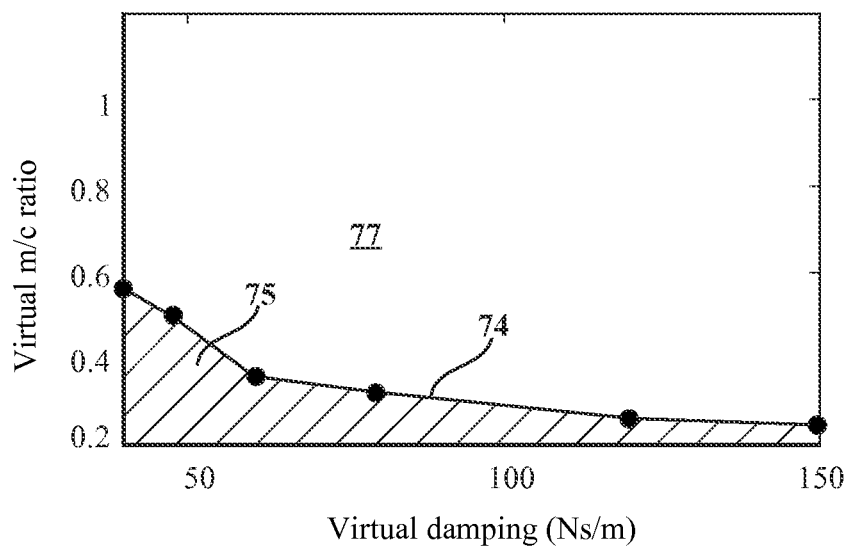
FIG. 4B is a schematic graphical representation of stability limits for motion of the robotic system along a Y axis.
Figure 5:
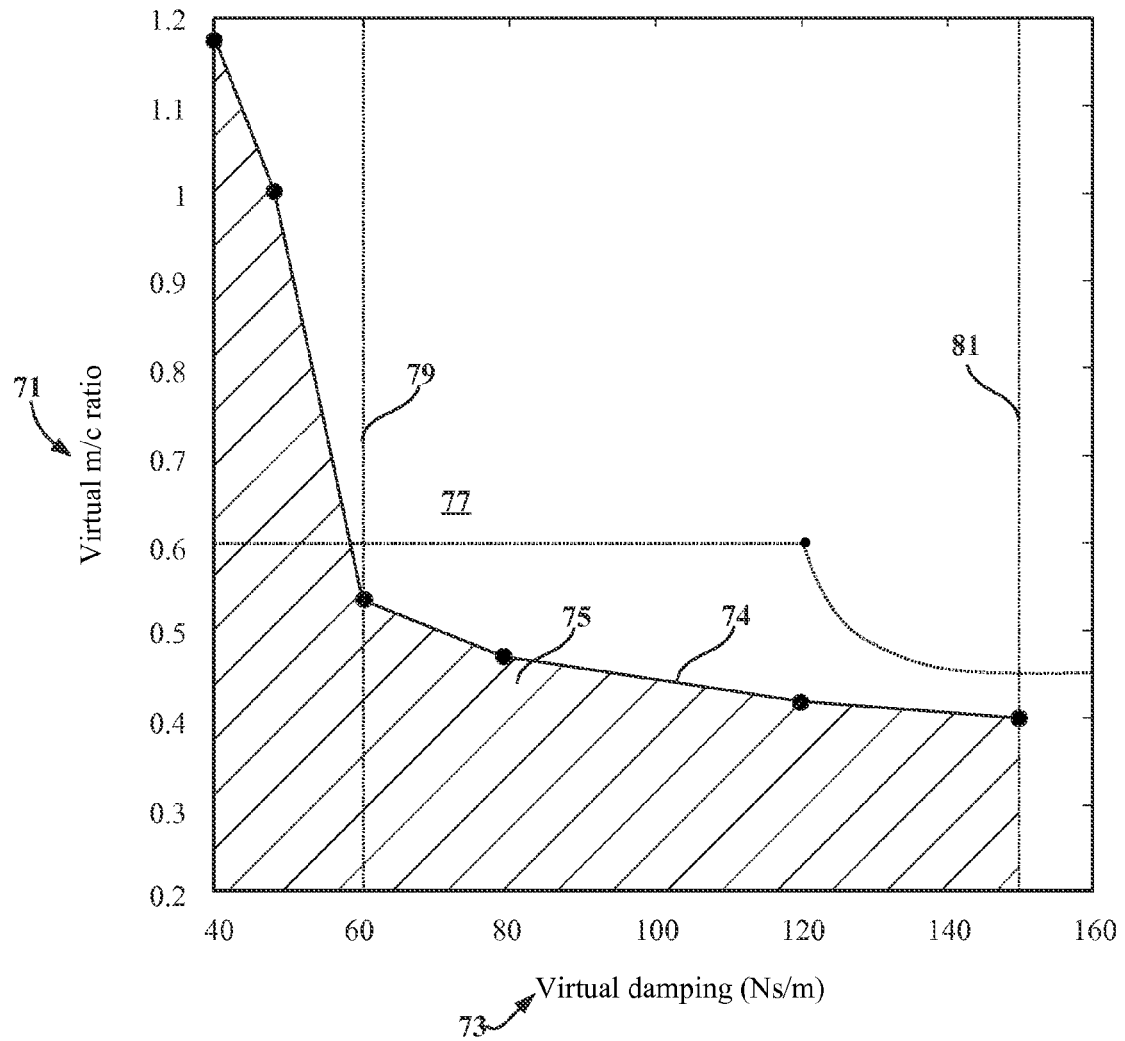
FIG. 5 is a schematic graphical representation of virtual mass to virtual damping ratio as a function of the virtual damping, for motion along the X axis.

Referring to FIGS. 4A, 4B, and 5, there exists a lower bound 74 on the virtual mass that the system can render. Below this virtual mass, vibrations or instability may occur when the operator 54 or environment is stiff. The minimum achievable virtual mass may be 6-10 times lower than the actual mass and no maximal virtual mass exists. The minimum mass that a device may render is dependent on the hardware, i.e., dynamics, friction, noise, transmission, stiffness, motors 58, etc.

As mentioned previously, the admittance parameters are adjusted according to the operator's inferred intentions. There are three possible inferences of the operator's 54 intensions: (1) accelerate; (2) stop; and (3) reverse direction. If the operator 54 wants to accelerate, the desired acceleration will be in the direction of the desired velocity, i.e., along or about the X, Y, and/or Z axis 36, 38, 40. In order to assist the operator 54 in accelerating the robotic system 20, the virtual damping and virtual mass may be decreased as a function of the magnitude of the desired acceleration. If the operator 54 wants to stop the robotic system 20, the desired acceleration will be in the direction opposite the desired velocity. Therefore, the virtual damping is increased, while lowering the virtual mass. If the operator 54 chooses to reverse the direction of the robotic system 20, the robotic system 20 must decelerate and then accelerate in the opposite direction. In this scenario, the virtual mass and virtual damping may be low, although it depends on initial and final conditions. The deceleration phase is detected by the controller 68 when the desired acceleration is in the direction opposite of the desired velocity.

The operator's 54 intentions are monitored as to whether to accelerate and/or decelerate. Since reversal of direction is comprised of a deceleration phase, followed by an acceleration phase, the operator's 54 intentions are only monitored with respect to these phases. More specifically, if the operator 54 wants to reverse direction, the virtual damping will be increased in the deceleration phase, to stop the robotic system 20, and then the virtual damping is reduced in the acceleration phase, to accelerate the robotic system 20.

The operator's 54 desire to either accelerate or decelerate is monitored by the controller 68. The magnitude and direction of the acceleration are monitored by using the desired acceleration formula (explained above). The desired acceleration formula yields the desired acceleration of the operator 54. The force measured from the force sensor 56 may be filtered before being introduced in the admittance equation (explained above). However, if a saturation limit or a virtual limit is reached, the desired acceleration will not be directly computed from the acceleration formula.

Next, the operator's 54 intention is deduced, as shown in FIG. 3. More specifically, the direction of the desired velocity $\dot{x}_d$ is determined at 76 and the direction of the desired acceleration $\ddot{x}_d$ is determined at 78. The direction of the desired velocity $\dot{x}_d$ and the desired acceleration $\ddot{x}_d$ are compared to one another at 80. If the desired acceleration $\ddot{x}_d$ is in the same direction as the desired velocity $\dot{x}_d$, the intention of acceleration is deduced at 82. Likewise, if the desired acceleration $\ddot{x}_d$ and the desired velocity $\dot{x}_d$ are in opposite directions, the intention of deceleration is deduced at 84.

Then, the admittance parameters are adjusted as a function of the magnitude of the acceleration and/or velocity at 86, i.e., by taking the absolute value of the acceleration and/or velocity 86. The admittance parameters are decreased if the intention of acceleration is deduced and increased if the intention of deceleration is deduced and may be decreased for increasing velocities. In order to adjust the admittance parameters, the default values must first be chosen. These default values are applied when no acceleration is required. For low acceleration, the value of the admittance parameters may be near the default values, i.e., applied when fine movements are required. Thus, in order to help the operator 54 perform precise movements, which are steady and stable, a high virtual damping is used as the default value. In order to obtain a smooth response, the virtual mass should not be too low. The default virtual mass may be chosen by applying a safety factor to the minimal virtual mass to virtual damping ratio (m/c) shown in FIGS. 4A, 4B. However, it should be appreciated that the safety factor to be chosen is dependent on the particular system being used.

Referring to the non-limiting example of FIG. 5, stability limits and controller parameter design for motion along the X axis 36 are shown. A minimum virtual mass to virtual damping ratio 71, versus a virtual damping 73 for X axis motion is shown. The hatched zone 75 is the zone in which vibrations can be felt by the operator while the clear (non-hatched) zone 77 is a zone without vibrations. The default values of the virtual damping $c_f$ and virtual mass $m_f$ are respectively $c_f$=120 Ns/m and $m_f$=72 kg. A minimum and a maximum value are chosen. The minimum is set to a breakpoint 79 appearing of 60 Ns/m, and the maximum 81 at 150 Ns/m. In this example, the virtual mass, which varied between 36 kg and 72 kg, is not limited.

The damping must be decreased if the operator 54 intends to accelerate and increased if the operator 54 wants to decelerate. The following relationships are used:

$$c_v = c_f - \alpha_a |\ddot{x}_d| \text{ for acceleration; and}$$

$$c_v = c_f - \alpha_d |\ddot{x}_d| \text{ for deceleration}$$

where $c_v$ is the effective virtual damping, while $\alpha_a$ and $\alpha_d$ are parameters to be tuned. It should be appreciated that the magnitude of the velocity may also be used in order to decrease the virtual damping. For a given maximum magnitude of $\ddot{x}_d$, noted as $|\ddot{x}_d|_{max}$, a rough estimate of $\alpha_d$ and $\alpha_d$ may be obtained by preventing $c_v$ from reaching a minimum allowed damping $c_{min}$ or maximum allowed damping $c_{max}$. The rough estimates for $\alpha_d$ and $\alpha_d$ may be mathematically represented as follows:

$$\alpha_a \approx \frac{c_f - c_{min}}{|\ddot{x}_d|_{max}}; \text{ and}$$

$$\alpha_a \approx \frac{c_{max} - c_f}{|\ddot{x}_d|_{max}}.$$

When adjusting the virtual mass, the virtual damping is also adjusted to provide better control over the behavior of the device. When acceleration is desired, both virtual damping and virtual mass should be decreased. In one non-limiting embodiment, a constant virtual mass/damping ratio is kept the same as for the default values such that the ratio remains constant. When the virtual damping ratio is kept constant, the dynamics of the robotic system 20 remain similar, which is intuitive to the operator 54.

When deceleration is desired by the operator 54, the virtual damping may be increased, while the virtual mass is decreased. In order to achieve the deceleration, while maintaining continuity of the parameters, an exponential function is used to compute the virtual mass. In this non-limiting example, a minimum virtual mass/damping ratio may be chosen and a transition smoothness parameter may also be set. The equations for the variable mass may be mathematically represented as:

$$m_v = \frac{m_f c_v}{c_f}$$

for acceleration; and $$m_v = \frac{m_f}{c_f}\left(1 - \beta\left(1 - e^{-\gamma(c_v - c_f)}\right)\right)c_v$$

for deceleration
where $m_v$ is the effective virtual mass, $\beta(0<\beta<1)$ is a parameter which may be used to adjust the steady state virtual mass to virtual damping ratio and $\gamma$ is the transition smoothness parameter used to adjust the smoothness with which the ratio changes. FIG. 4A illustrates the virtual mass, computed as a function of the virtual damping, using the variable mass equations, for motion along the X axis 36. It should be appreciated that in order for the dynamics to be the same along the X axis 36 and the Y axis 38, the same parameters should be used with respect to both axes 36, 38. However, for simplicity, only the X axis 36 will be discussed with the intention that the same will be applied to the Y axis 38, as shown in FIG. 4B.

The virtual damping and virtual mass may be varied proportionally to the magnitude of the desired acceleration. It should be appreciated, however, that these parameters may also be varied according to the magnitude of the velocity, in order to help the operator 54 perform constant high velocity movements.

It may be desired to tune the parameters $\alpha_s$ and $\alpha_d$. The $\alpha_s$ and $\alpha_d$ parameters may be tuned using simulation data or inputting recorded force data. An estimation of $\alpha_s$ and $\alpha_d$ may be obtained by using the rough estimate formulas provided above, which incorporate the anticipated maximum magnitude of $\ddot{x}_d$. Also, experiments may be conducted with the robotic system 20 to typical tasks to be performed and for high accelerations. Monitoring the virtual damping during these experiments provide an indication of how to set the $\alpha_s$ and $\alpha_d$ parameters so that the virtual damping changes significantly without getting to the minimum or maximum value.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of inferring intentions of an operator to move a robotic system, the method comprising:
    monitoring the intentions of the operator, with a controller, with respect to the robotic system, wherein the controller has an algorithm configured for inferring the intentions of the operator and processing the inferred intentions;
    inferring the intentions of the operator to be at least one of a desired acceleration, a desired deceleration and a desired velocity;
    modifying values of a virtual mass and a virtual damping of the robotic system, within the controller, as a function of at least one of the inferred acceleration, deceleration, and velocity such that the values of the virtual mass and the virtual damping decrease when the intention of acceleration is inferred and the values of the virtual mass and the virtual damping are increased when the intention of deceleration is inferred; and
    determining a desired speed of the robotic system, as a function of the modified values of the virtual mass and virtual damping.

2. A method, as set forth in claim 1, further comprising:
    selecting default values for the values of the virtual mass and the virtual damping; and
    applying the default values when no desired acceleration and no desired deceleration is deduced.

3. A method, as set forth in claim 1, wherein monitoring is further defined as determining a magnitude and a direction of the desired acceleration.

4. A method, as set forth in claim 3, wherein monitoring further includes detecting a force applied by the operator to move the robotic system.

5. A method, as set forth in claim 4, further comprising:
    determining a current velocity of the robotic system; and
    taking an absolute value of the current velocity to determine a magnitude of the desired velocity;

wherein modifying the values of the virtual mass and the virtual damping, within the controller, as a function of at least one of the inferred acceleration, deceleration, and velocity is further defined as modifying the values of the virtual mass and the virtual damping as a function of at least one of the inferred acceleration, deceleration, and the magnitude of the desired velocity.

6. A method, as set forth in claim 5, further comprising comparing the direction of the desired velocity to the direction of the desired acceleration;
   wherein acceleration is deduced when the desired acceleration and the desired velocity are in the same direction; and
   wherein deceleration is deduced when the desired acceleration and the desired velocity are in opposite directions.

7. A method, as set forth in claim 1, wherein the values of the virtual mass and the virtual damping move to a default value when no intention of the operator is deduced.

8. A method, as set forth in claim 1, wherein monitoring the motion of the robotic system desired by the operator is further defined as:
   sensing a force imparted by the operator on the robotic system; and
   determining the motion of the robotic system desired by the operator to be a velocity and one of an acceleration and a deceleration, as a function of the sensed force.

9. A robotic system comprising:
   a trolley configured for movement along a first axis;
   a sensing handle operatively connected to the trolley and configured to be grasped by an operator such that the sensing handle measures a force between the operator and the robotic system;
   a controller operatively connected to the sensing handle and including an algorithm, wherein the algorithm is configured for:
      monitoring the intentions of the operator, with respect to the robotic system;
      inferring the intentions of the operator to be at least one of a desired acceleration, a desired deceleration, and a desired velocity;
      modifying values of a virtual mass and a virtual damping of the robotic system, within the controller, as a function of at least one of the inferred acceleration, deceleration, and velocity such that the values of the virtual mass and the virtual damping decrease when the intention of acceleration is inferred and the values of the virtual mass and the virtual damping are increased when the intention of deceleration is inferred; and
      determining a desired speed of the robotic system, as a function of the modified values of the virtual mass and the virtual damping.

10. A robotic system, as set forth in claim 9, wherein the sensing handle includes at least one force sensor configured to measure the force between the operator and the robotic system.

11. A robotic system, as set forth in claim 10, further comprising a motor operatively connected to the trolley; wherein the motor is configured to propel the trolley along the first axis in response to the deduced intentions of the operator.

12. A robotic system, as set forth in claim 10, wherein the controller is an admittance controller configured to accept the force measured by the at least one force sensor and, in turn, output a displacement of the trolley.

13. A method of moving a robotic system along a first axis, the method comprising:
   providing a controller having an algorithm configured for inferring intentions of an operator and processing the inferred intentions;
   monitoring the intentions of the operator, with the controller, with respect to the robotic system;
   deducing the intentions of the operator to be one of a desired acceleration and a desired deceleration;
   adjusting values of a virtual mass and a virtual damping of the robotic system, within the controller, as a function of one of a magnitude of the desired acceleration and the desired deceleration;
   wherein the values of the virtual mass and the virtual damping of the robotic system are decreased when the intention of acceleration is deduced;
   wherein the values of the virtual mass and the virtual damping of the robotic system are increased when the intention of deceleration is deduced;
   determining a desired speed of a trolley along the first axis as a function of the virtual mass and virtual damping of the robotic system; and
   transmitting power to a motor to move the trolley along the first axis, at the desired speed.

14. A method, as set forth in claim 13, further comprising:
   selecting default values for the values of the virtual mass and the virtual damping of the robotic system; and
   applying the default values when no desired acceleration and no desired deceleration is deduced.

15. A method, as set forth in claim 13, wherein monitoring is further defined as determining a magnitude and a direction of the desired acceleration.

16. A method, as set forth in claim 15, wherein monitoring further includes detecting a force applied by the operator to move the robotic system.

17. A method, as set forth in claim 16, wherein monitoring further includes determining a magnitude and a direction of the desired velocity.

18. A method, as set forth in claim 17, further comprising comparing the direction of the desired velocity to the direction of the desired acceleration;
   wherein acceleration is deduced when the desired acceleration and the desired velocity are in the same direction; and
   wherein deceleration is deduced when the desired acceleration and the desired velocity are in opposite directions.

19. A method, as set forth in claim 13, wherein the values of the virtual mass and the virtual damping of the robotic system move to a default value when no intention of the operator is deduced.

* * * * *